Dec. 12, 1967   R. D. SCHIBLEY   3,358,120

OVEN

Filed Sept. 28, 1965

WITNESSES
Theodore F. Wrobel
James T. Young

INVENTOR
Raymond D. Schibley
BY Edward C. Arenz
ATTORNEY

United States Patent Office 3,358,120
Patented Dec. 12, 1967

3,358,120
OVEN
Raymond D. Schibley, Ashland, Ohio, assignor to Westinghouse Electric Corporation, Pittsburgh, Pa., a corporation of Pennsylvania
Filed Sept. 28, 1965, Ser. No. 490,942
5 Claims. (Cl. 219—395)

ABSTRACT OF THE DISCLOSURE

Apparatus for a cooking oven of the type in which a food article is adapted to have both the upper and lower faces simultaneously broiled by upper and lower closely spaced broiling elements, the apparatus providing shielding around the lower broiling element and also serving to support the food article and properly locate it relative to the lower broiling element.

---

This invention relates to ovens and in particular to an oven arrangement in which a high speed broiling operation is carried out.

Filipak U.S. patent application Ser. No. 384,657 discloses an oven arrangement in which broiling elements are located closely above the top face of an article to be broiled and closely below the bottom face of the article, and are energized simultaneously to broil both faces at once. This invention is generally concerned with a broiling arrangement of this character and in particular with the provision of accessory means to obviate certain objections to this type of broiling arrangement and to make it more appealing in use to the housewife. One of the potential objections to this type of broiling arrangement is that the provision of relatively closely spaced heating elements, both energized to perform a broiling function, concentrates a substantial amount of heat in the region where the broiling operation is being carried out. While the relatively short duration of the broiling operation, coupled with the partly open oven door, will as a rule prevent the outer side walls of the oven from reaching a temperature in excess of the established safe limits, it is desirable, in accordance with my invention, to provide additional means serving as further assurance that the safe limits will not be exceeded. Accordingly, this invention deals with such additional means which shield the side walls of the oven liner from a substantial part of the heat generated in the broiling operation. At the same time, such means function to reduce soiling of the oven liner and conveniently serve to also support and locate the rack upon which the article to be broiled is placed.

The currently preferred arrangement includes a three-sided shell with open faces at the top, bottom and rear, and dimensioned to substantially center the lower broiler element within the shell in its operational position. The shell further includes means for supporting a rack adjacent its top face in an operational position which substantially centers the article to be broiled between the top and bottom broiler. Means are also provided to facilitate locating the shell properly with respect to the oven rear and side walls. The shell walls prevent spatters of grease and juices from the article being broiled from striking a substantial portion of the oven liner walls, and the open top and bottom faces of the assembly permit them to drop into a receptacle positioned in the lower part of the oven. Of course, the shell also shields certain parts of the walls of the oven liner from the radiant heat of the lower element.

Figure 1:
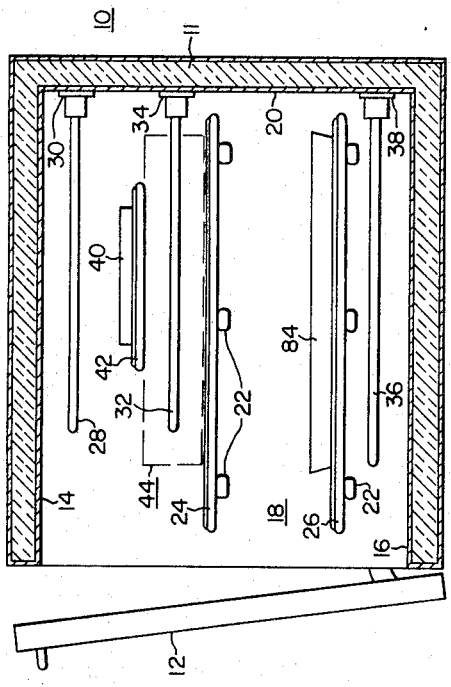
Figure 2:
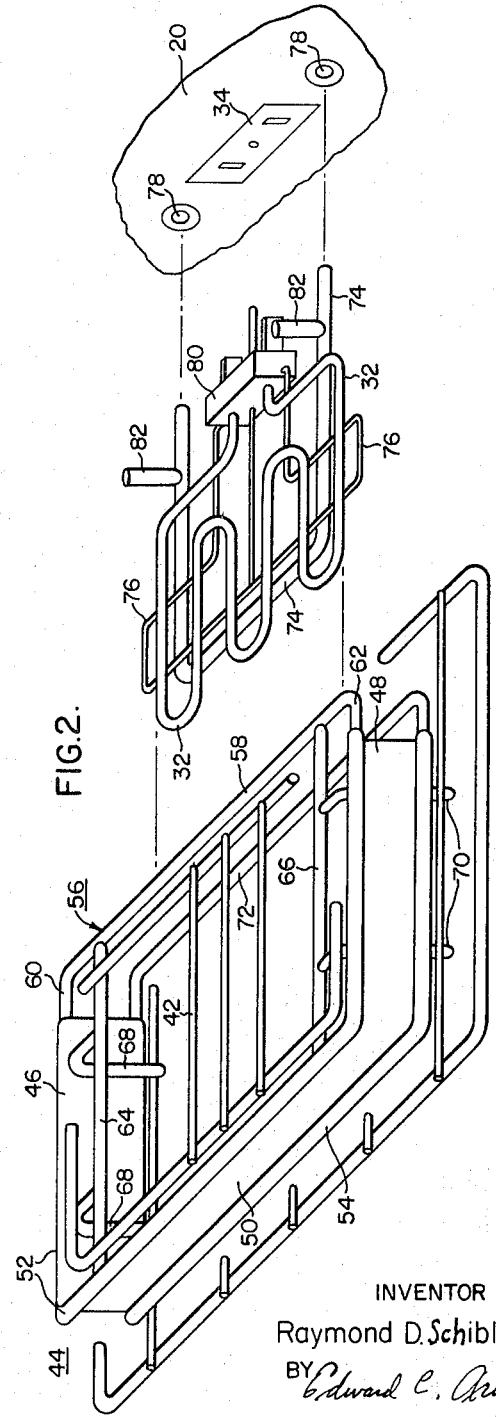

The invention will be described in connection with the accompanying drawing illustrating a preferred embodiment incorporating the principles of the invention by way of example, and wherein:

FIGURE 1 is a generally diagrammatic side view, in the nature of a vertical section, of an oven showing the locational relationship of the principal parts according to the invention; and FIG. 2 is an isometric view of the lower broiler element at the right, and with the shell and a supporting open work grid shown in exploded relation at the left.

The oven 10 has the conventional rectangular, box shape formed by the outer walls and the inwardly spaced oven liner walls. Thermal insulation batts 11 fill the space between the walls. The usual hinged front door 12 is also provided. The inner liner walls include a top wall 14, a bottom wall 16, opposite side walls 18, and rear wall 20. The side walls are suitably embossed inwardly as indicated at 22, or provided with other means on the inner surfaces to provide tracks which support the openwork grids 24 and 26 for generally horizontal movement into and out of the oven cavity through the open front.

The electric heating elements for the oven are plugged into receptacles provided at the rear wall of the oven in a vertically-spaced arrangement. As illustrated in FIG. 1, the top broiling element 28 is shown plugged into the top receptacle 30, the lower broiling element 32 is shown plugged into the intermediately located receptacle 34, and the baking element 36 is plugged into the bottom receptacle 38.

When the two-face broiling operation is carried out, both the top broiling element 28 and the lower broiling element 32 are energized for maximum radiant heating of the upper and lower faces of the meat or other article 40 to be broiled. The article 40 is supported on an openwork rack 42 which is in turn supported upon the shell 44 which has its location relative to the lower broiling element 32 indicated in outline form by the broken lines in FIG. 1.

The shell structure is best seen in FIG. 2 and includes opposite side walls 46 and 48 and a front wall 50, all of which may be formed from a single sheet bent into the plan view U-shape shown. The top edge of each wall has a rolled margin 52 and the bottom edge a similar rolled margin 54. A skeletal frame generally designated 56 made of wire rods suitably welded together extends across the top face and rear of the shell. The frame includes a rear U-shaped portion having a bight 58 and opposite outer legs 60 and 62 received by the open rear ends of the rolled top edge 52 of the shell. Intermediate legs 64 and 66 have their rear ends secured to the bight 58 and extend forwardly with their forward ends secured to the front wall 50 of the shell. A pair of depending legs 68 spaced from each other in a front-to-rear direction at the left side of the shell have their upper, inner ends attached to the inner leg 64 and extend over to the side wall 46 to the shell and then downwardly to project below the bottom open face of the shell. Another pair of depending legs 70 at the right side of the shell are arranged in mirror image with respect to legs 68 and extend down along the right wall 48.

The rear open ends of bottom rolled edges 54 of the shell receive the forwardly-projecting legs of another U-shaped member 72. The top and bottom wire rod frames 56 and 72, respectively, rigidify the shell 44 and provide support and locating structure cooperating with other elements of the oven structure in a manner which will be described hereinafter.

The rack 42 upon which the article to be broiled is placed has a rectangular shape in outline and a number of intermediate support wires. Most of the rack 42 is broken away in FIG. 2 to obtain a clearer view of the shell structure. The rack is supported very simply by resting it upon the openwork frame 56.

The shell itself is supported by the horizontally-slidable conventional oven grid 24 supported by the track means 22. The downwardly-projecting ends of the depending legs 68 and 70 at the left and right sides of the shell limit movement in a sideways direction by engaging against one or another of the front-to-rear extending members of the grid 24. Establishing the proper location of the shell in a front-to-rear direction in the oven is accomplished by limiting movement of the shell in a rearward direction through engagement of the bight 58 of the top frame 56 against stop means associated with the lower broiler element 32.

As shown in the right-hand part of FIG. 2, the broiler element 32 is, in one preferred example, supported by a heavy U-shaped wire rod 74 which in turn supports a T-shaped wire skeleton 76 underlying the broiler element. The element is shaped to extend back and forth in serpentive fashion as illustrated to adequately cover a given area. The heavy support rod 74 includes rear end portions which extend into bushed apertures 78 provided in the rear wall 20 of the oven liner when the male connector 80 is plugged into the receptacle 34. By means of this cantilever support arrangement, the broiling element 32 projects forwardly in a generally horizontal plane with an unobstructed space around it so that the shell can be slid back into encompassing relation around it. However, each of the legs of the heavy U-shaped support 74 has an upstanding pin or stop 82 secured thereto to serve as abutments against which the bight rod 58 of the openwork frame 56 of the shell 44 engages as the shell and the underlying support grid 24 are pushed rearwardly into an operating position. This properly locates the shell in a front-to-rear direction in the oven.

It will be appreciated that in accordance with the invention, attention must be given to the correct dimensioning and placement of the various elements which cooperate with each other to obtain the proper locational relationships. For example, the track means formed by the embossments 22 are located at a specific level relative to the location of the lower broiler element receptacle 34 and the support apertures 78 so that the height of the shell 44 in its operating position is such that the element 32 is substantially centered therein in a vertical direction. The height of the shell 44 is also designed so that the rack 42 upon its stop surface supports the article 40 to be broiled at a level substantially centered between the upper and lower broiling elements.

While due consideration must be given to the dimensions and placement of the various structural elements which relate to each other, it will be readily appreciated that in light of the foregoing description these determinations are relatively simple. For example, it may be assumed that in most instances where the two-faced broiling is to be carried out, the article to be subjected to broiling will range to between one, and two and one-half inches thick. Accordingly, these dimensions may be used as a guide so that substantial centering of the article is effected even though, depending upon the thickness of the article, one face of it may be slightly closer to its facing broiling element than the opposite face is to its broiling element. Of course, for the connoisseur who considers the preparation of the food to be in the realm of art, the rack 42 may be arranged to be adjustable by providing notched legs or similar means to vary its level relative to the broiling elements and to the shell 44.

Partly by way of summary, in using the oven arrangement described for the two-face broiling operation, the steps to be followed and the results therefrom are essentially as follows. The conventional oven grid 24 is first placed upon the track means 22 having the predetermined level which is proper for the two-face broiling. The shell structure 44 is placed upon the grid 24 with the downwardly projecting ends of the legs 68 and 70 extending through the proper spaces of the grid 24 to substantially center the shell in a sideways direction. The rack 42 is placed upon the top surface of the shell and is supported by the inner elgs 64 and 66, and the upper parts of depending legs 68 and 70. The article to be broiled is placed upon the rack 42 in a substantially centered position. The grid 24 and shell 44 are then pushed rearwardly into the oven until the bight 58 of the openwork frame strikes the upright pins 82. This will automatically properly center the shell in a front-to-rear direction. The lower broiler element 34 and its supporting structure of course occupy a horizontal stratum open at the rear of the shell and generally centered in a vertical direction with respect to the shell 44. During the broiling operation the grease and juices which drop from the article being broiled will for the most part fall into an upwardly open receptacle or pan 84 placed on a lower grid 26. Some of the falling liquid from the article may strike the hot element 32, but because of its high surface temperature the liquid will for the most part behave generally in the fashion of a drop of water being dropped on a hot iron—that is, it forms a ball and bounces off. It is this phenomenon which avoids undue smokiing and fire with the two-face broiler arrangement. To the extent that the liquid droplets would take a path carrying them against the side walls of the oven liner, a large part of the liner walls are shielded by the shell side walls and front wall 50.

The shell not only shields the liner walls from grease and heat, but also shields the heating element 32 from the user. In other words, since the shell 44 in its preferred form encompasses the front and both sides of the heating element, and since the shell is carried by the slidable grid 24 the article may be loaded and unloaded in safer fashion and without imposing a psychological barrier to the user who might otherwise be disturbed by the apparently unshielded view of the extremely hot broiling element.

Accordingly, while the concept may superficially appear to be but a simple expedient, it will be apparent that the multitude of functions so neatly performed lend the arrangement a stature not readily appreciated without full consideration of results which flow from the concept.

The invention has been described in its now preferred commercial form. However, it is not to be considered to be limited in scope to that form alone. It is adapted to variations in detail without departing from the essence of the concept. For example, in alternative embodiments the openwork frame 56 associated with the shell may take various forms. The sideways locating means may be simple pins secured to the bottom edge of the shell rather than being the terminal ends of the depending legs 68 and 70. The means for supporting the rack 42 may in another alternative embodiment simply constitute several bail shaped elements secured to the inner faces of the side walls. The shell 44 itself may in an alternative embodiment be made in three separate wall pieces hinged at the rear corners, and with the front wall corners provided with slot and tab elements which interlock and which may be released later so that the whole shell may be folded flat when not in use. Such examples are merely illustrative of the type of variations in structure which the inventive concept supports.

I claim as my invention:
1. In an oven:
   a first broiling element in the top portion of said oven for broiling the top surface of an article;
   a second broiling element spaced below said upper broiling element at a distance sufficiently close to said upper broiling element to exert a substantially greater broiling than baking effect upon the lower surface of said article, said second broiling element further being spaced substantially above the bottom of said oven; and
   oven heat and spatter shielding means, independent and separable from said second broiling element, including shell means extending along at least the two sides of said second broiling element and providing upright walls extending between said second broiling element and the facing, side walls of said oven, said shielding means including an open rear face for slidably receiving therethrough said second broiling element.

2. In an oven:
   a first broiling element in the top portion of said oven for broiling the top surface of an article;
   a second broiling element spaced below said upper broiling element at a distance sufficiently close to said upper broiling element to exert a substantially greater broiling than baking effect upon the lower surface of said article; and
   means for shielding selective portions of the inner wall surface of said oven from radiant heat from said second broiling element, said shielding means comprising an integral shell structure extending along the sides and the front of said element and having substantially open top and bottom and rear faces;
   an openwork rack for supporting said article to be broiled; and
   means for supporting said openwork rack upon said top open face of said shell structure.

3. In an oven:
   a first broiling element in the top portion of said oven for broiling the top surface of an article;
   a second broiling element spaced below said upper broiling element at a distance sufficiently close to said upper broiling element to exert a substantially greater broiling than baking effect upon the lower surface of said article;
   a first, horizontally-slidable, openwork grid spaced relatively closely below said second broiling element;
   a shell structure adapted to be removably supported on said first grid, said shell structure having a generally rectangular outline form in plan, and having substantially open top, bottom and rear faces, said shell structure having a height to extend both above and below the level of said second broiling element when said shell structure is supported on said first grid;
   an openwork rack for supporting an article to be broiled on both faces simultaneously by said first and second broiling elements; and
   means for supporting said rack from the top of said shell structure.

4. In an oven according to claim 3:
   support means for said second broiling element, said support means including stop means projecting out of the plane of said support means;
   means extending across said rear open face of said shell structure for engagement with said stop means for correctly positioning said shell structure in a front-to-rear direction in said oven.

5. In an oven according to claim 4:
   means projecting downwardly from said shell structure for engagement with said first grid to limit movement of said shell structure relative to said grid in a side-to-side direction.

References Cited

UNITED STATES PATENTS

| | | | |
|---|---|---|---|
| 1,392,802 | 10/1921 | Serrell | 219—399 X |
| 2,024,386 | 12/1935 | Phelps | 219—385 |
| 2,984,730 | 5/1961 | Ostrom et al. | 99—390 X |
| 3,161,755 | 12/1964 | Tilus | 99—340 X |
| 3,270,660 | 9/1966 | Filipak | 219—403 X |

RICHARD M. WOOD, *Primary Examiner.*

C L. ALBRITTON, *Assistant Examiner.*